United States Patent [19]

Scinta

[11] Patent Number: 4,695,214

[45] Date of Patent: Sep. 22, 1987

[54] APPARATUS AND METHOD FOR FEEDING SOLID MATERIALS TO A HIGH PRESSURE VESSEL

[75] Inventor: James Scinta, Bartlesville, Okla.

[73] Assignee: Phillips Petroleum Company, Bartlesville, Okla.

[21] Appl. No.: 757,817

[22] Filed: Jul. 22, 1985

[51] Int. Cl.$^4$ ............................................. B65G 65/32
[52] U.S. Cl. .................................... 414/221; 414/786; 414/217
[58] Field of Search ............... 414/217, 218, 220, 221, 414/786; 48/86 R, DIG. 7

[56] References Cited

U.S. PATENT DOCUMENTS

| | | | |
|---|---|---|---|
| 3,729,105 | 4/1973 | Huebler et al. | 214/17 B |
| 4,247,240 | 1/1981 | Schora, Jr. et al. | 414/221 X |
| 4,401,402 | 8/1983 | Casperson | 414/218 |

OTHER PUBLICATIONS

"Coal Feeder Development, Phase I Report," Foster-Miller Associates, Inc., Waltham, Mass., FE-17-93-10, ERDA (Mar. 1976), pp. 4–51, 148–171, Apps. A, B, and F.

"Coal Feeder Development Program," Quarterly Technical Progress Report, Lockheed Missiles & Space Company, Inc., FE-1792-4 (Sep. 30, 1975), pp. 12 and 104–111.

Ferretti, E. J. "Feeding Coal to Pressurized Systems" *Chemical Engineering* (Dec. 9, 1974), pp. 113–116.

Lewis, R. et al., "Coal Pressurization and Feeding—Use of a Lock Hopper System" In: *Proceedings of the Conference on Coal Feeding Systems,* held at Cal. Inst. of Tech. prepared by JPL (Sep. 15, 1977), pp. 65–72.

Funk, E. et al., "Comparative Description of Coal Feeding Systems for Fixed Bed Pressure Gasification," In: *Proceedings of the Conference on Coal Feeding Systems,* held at Cal. Inst. of Tech., prepared by JPL (Sep. 15, 1977), pp. 139, 150, and 151.

*Primary Examiner*—Robert J. Spar
*Assistant Examiner*—Stuart J. Millman
*Attorney, Agent, or Firm*—William R. Sharp

[57] ABSTRACT

An apparatus and method utilize liquid pressurized lock hoppers to feed solids to a high pressure vessel. Solids are introduced to a first lock hopper, and gases are passed to the first lock hopper from a second lock hopper which has previously discharged solids. Liquid is supplied to the first lock hopper so as to attain a pressure equivalent to the pressure of the high pressure vessel. Solids are discharged from the first lock hopper to a high pressure vessel after pressurization.

12 Claims, 3 Drawing Figures

APPARATUS AND METHOD FOR FEEDING SOLID MATERIALS TO A HIGH PRESSURE VESSEL

BACKGROUND OF THE INVENTION

In one aspect, the invention relates to an apparatus for feeding solids to a high pressure vessel. According to another aspect, the invention relates to a method for feeding such solids to a high pressure vessel.

There are many known processes wherein solids are transferred from a low pressure zone to a higher pressure zone. Examples of such processes include, for example, various pyrolysis, gasification, liquefaction, and extraction processes which utilize solid carbonaceous fuels. A common method of feeding solids from a low pressure zone to a high pressure zone involves gas-pressurized lock hoppers. According to such techniques, solids are introduced to the lock hopper at a low pressure and then a gas is pumped into the hopper so as to pressurize the hopper chamber to a high pressure. The solids are then discharged from the hopper so as to be transferred to the high pressure zone. The use of gases to pressurize the lock hopper has several distinct disadvantages. First, pressurization of the lock hopper with the gas requires a major portion of the cycle time. This has economic penalties since the hopper size to do a given job increases with the cycle time. Further, the gas used for pressurization will tend to mix with gases in the high pressure vessel to which solids are transferred. This causes dilution of the desired gas mix in the high pressure vessel and can interfere with critical process dynamics. This problem may become critical enough to require removal of the pressurizing gas from the gas stream in the high pressure vessel, thus increasing the cost of the system. Finally, valves utilized in a gas-pressurized lock hopper feed system must operate in a dusty abrasive environment, with a consequent short working life.

Some of the above discussed disadvantages of gas pressurized lock hoppers are overcome by a liquid sealed lock hopper system as described in U.S. Pat. No. 3,729,105 of Huebler et al. In this system, solids are transferred from a storage bin to a lock hopper which contains a liquid. Any overflow liquid is collected in a separate collecting vessel. Further liquid is supplied as needed to attain a pressure in the lock hopper which is substantially equal to the pressure of the high pressure vessel to which the solids are desired to be transferred. A valve is then opened at the outlet of the lock hopper so as to discharge the solids, the solids being allowed to drop into a feeder which conveys the solids to the high pressure vessel. Liquid contained in the feeder during transfer of the solids to the high pressure vessel provides a liquid seal between the high pressure vessel and the lock hopper. Thus, intermixing of gases from the lock hopper and high pressure vessel is inhibited. Smaller lock hoppers can be used in such a system since only a very short time is required to pressurize the lock hopper using a liquid due to the relative incompressibility of the liquid. Valve life is also lengthened due to the use of a liquid rather than a gas.

Although the above described liquid sealed system is a considerable improvement over gaseous systems, improvement would be desirable, particularly with respect to efficiency.

SUMMARY OF THE INVENTION

It is, therefore, an object of the present invention to provide an improved apparatus and method of feeding solids to a high pressure vessel wherein liquid pressurized lock hoppers are employed.

The above object is realized in a method which includes the steps of: introducing solid materials to a first lock hopper; passing gases from a second lock hopper, from which solid materials have been previously discharged, to the first lock hopper; supplying a liquid to the first lock hopper so as to attain a pressure substantially equal to the pressure of the high pressure vessel; and discharging the solid materials from the first lock hopper and through the liquid so as to be introduced to the high pressure vessel.

According to another aspect of the invention, an apparatus is provided which includes first and second lock hoppers wherein each lock hopper has an inlet and an outlet. The apparatus further includes a means for providing selective fluid communication between the lock hoppers; a means for selectively supplying solid materials to either of the lock hoppers through a respective inlet; a means for selectively supplying liquid to either of the lock hoppers; a vessel having an inlet; a first valve means, associated with the first lock hopper outlet, for selectively allowing discharge of the solid materials from the first lock hopper to the vessel; and a second valve means associated with the second lock hopper outlet. The above mentioned means for providing selective fluid communication between the lock hoppers enables passing of gases from one lock hopper to the other lock hopper. Introduction of gases from one lock hopper, which has previously discharged solids, to another lock hopper assists in pressurization of the latter mentioned lock hopper. This saves some compression energy, and thus increases the efficiency of the system.

DESCRIPTION OF THE PREFERRED EMBODIMENTS

Figure 1:
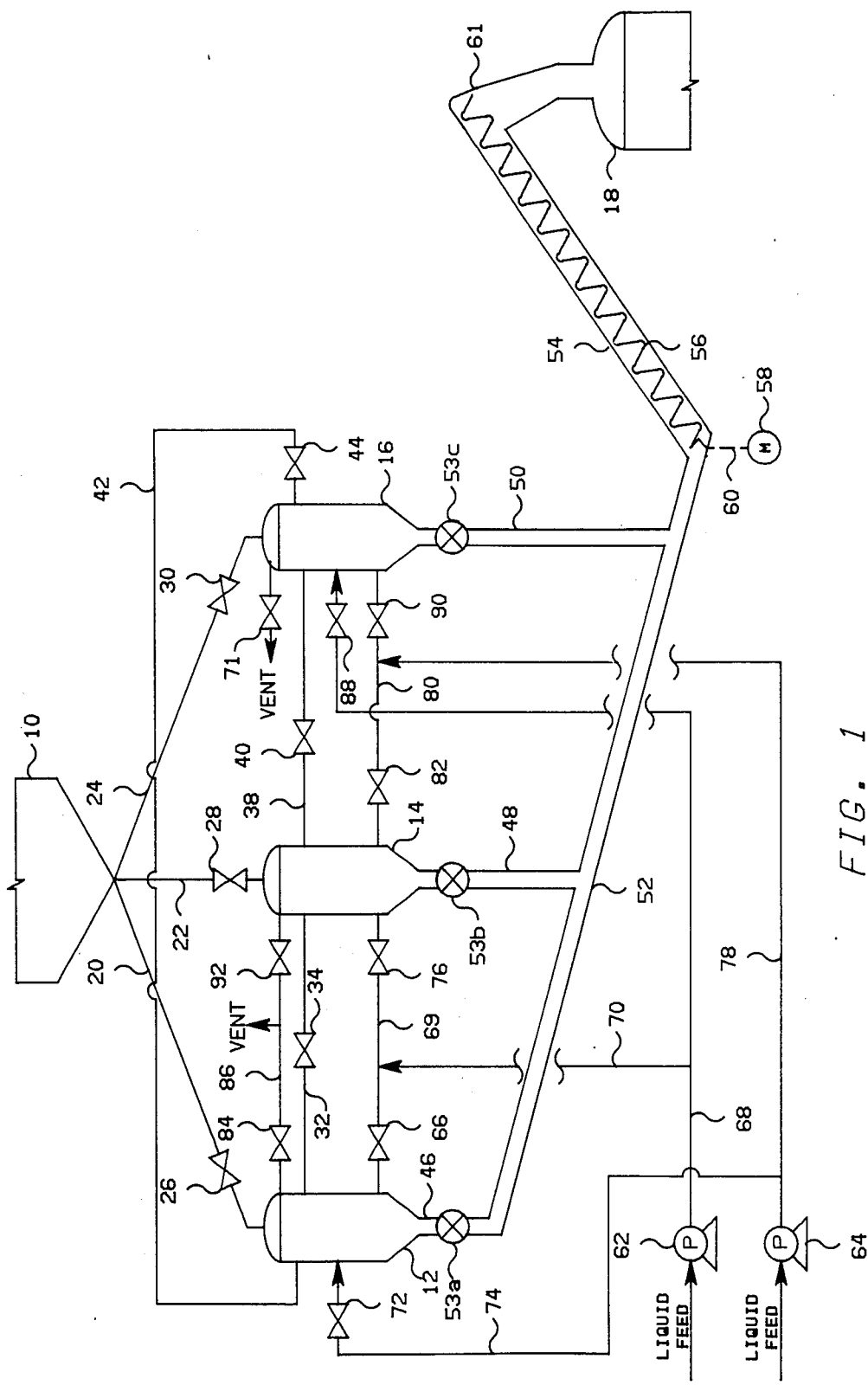
FIG. 1 is a schematic representation of one embodiment of an apparatus according to the present invention.

A preferred embodiment of the present invention will now be described with reference to the drawings. It should be understood that the present invention as described can be applied to various pyrolysis, gasification, and extraction processes involving carbonaceous solids. One example of such a process is oil shale retorting, wherein the high pressure vessel utilized is a retort. Even more broadly, the present invention can be applied to any process which requires feeding solids from a low pressure zone to a zone of higher pressure.

The illustrated apparatus includes a solids storage bin 10, mormally kept at atmospheric pressure; lock hoppers 12, 14 and 16; and high pressure vessel 18. The outlet of storage bin 10 is in communication with inlets of the lock hoppers via lines 20, 22 and 24. As used herein, "line" refers to any appropriate conduit means which defines a flow path for either a gas or a liquid.

Also as used herein, the term "lock hopper" is defined simply as a sealable vessel. As shown, valves 26, 28 and 30 are included along conduits 20, 22 and 24 respectively. Each of these valves can be selectively opened or closed to permit solids to be introduced into its corresponding lock hopper. Lines 20, 22 and 24 are shown as being sloped so as to provide a gravity feed of solids from storage bin 10 to the lock hoppers. This type of feed mechanism is shown for the sake of simplicity. In actual practice, however, providing gravity feed of solids to a multi-lock hopper system would be somewhat impractical, since lines 20, 22 and 24 would have to extend to impractical heights in order to achieve the required flow angles for effective gravity feed of solids along the lines. As an alternative to the illustrated gravity feed system, suitable means for transporting solids along the lines could be provided, such as endless conveyor belts, augers, star valves etc.

Lock hoppers 12 and 14 are connected so as to be in communication with one another by line 32. Included along line 32 is valve 34 which cooperates with line 32 to provide for selective fluid communication between lock hoppers 12 and 14. Likewise, a line 38 extends between lock hoppers 14 and 16, valve 40 being included along line 38, and a line 42 extends between lock hopper 16 and lock hopper 12, valve 44 being associated with line 42.

Conduits 46, 48 and 50 connect the respective outlets of lock hoppers 12, 14 and 16 to a common conduit 52 which generally slopes downward from an uppermost point directly below lock hopper 12. Also as shown, valves 53a, 53b and 53c are included along line 46, 48 and 50 respectively. The lower end of conduit 52 is connected to the lower end of a conduit 54 which extends in a generally upward direction. Rotatably mounted within conduit 54 is a screw conveyor 56 which extends longitudinally along substantially the entire length of conduit 54 from its lower end to its upper end. A motor 58 is provided for rotating screw conveyor 56. A suitable drive link, shown schematically at 60, connects motor 58 to screw conveyor 56. Screw conveyor 56 when rotated functions to convey solids from the lower end of conduit 54 to the upper end of conduit 54, and allows liquid to drain off from the solids as they are being transferred. To accomplish such drain off, it is desirable that the diameter of screw conveyor 56 be less than that of the inside diameter of conduit 54. Apertures could be provided in the screw conveyor to assist in drainage of liquid, but a solid construction is generally preferred. It is desirable in most applications that liquid be prevented from reaching high pressure vessel 18. Alternative devices for conveying solids in conduit 54 include an endless chain-mat or a bucket conveyor system which essentially comprises a series of buckets, preferably with apertures therethrough, mounted on an endless belt.

A conduit 61 is connected to the upper end of conduit 54 and extends in a generally downward direction to the inlet of high pressure vessel 18. As noted above, the nature of high pressure vessel 18 depends upon the process which is being performed. If oil shale is being retorted, high pressure vessel 18 is a retort. In the case of coal gasification, high pressure vessel 18 would be a gasifier.

Pumps 62 and 64 are provided to pump liquid to the lock hoppers as will be described further below. The inlet of each pump is in fluid communication with an appropriate reservoir (not shown) which contains the liquid. Pump 62 is preferably a low pressure pump, such as a centrifugal pump. Pump 64 is preferably a high pressure pump of, for example, the reciprocating or diaphragm type. The low pressure pump 62 has the capability of pumping a large volume of liquid in a relatively short amount of time, but at relatively low pressures. This is quite sufficient for the pumping of liquids into the lock hoppers according to one step in the operation of the apparatus, described in detail below. High pressure pump 64 has the capability of pumping liquid at a much higher pressure, but moves a smaller volume of liquid per unit time than pump 62. As will be further described in connection with operation of the apparatus, high pressure pump 64 is utilized to pressurize the lock hoppers. As an alternative to the illustrated arrangement, high pressure pump 64 could be used to perform the functions of low pressure pump 62. However, this is not desirable since this would considerably increase the time requirements of a process performed with the apparatus. Various valves and lines cooperate as described further below such that either pump may selectively be operated to pump liquid to the lock hoppers.

With respect to the liquid employed, it preferably has a density less than that of the solid materials being conveyed in the apparatus, and preferably should not excessively vaporize at the temperatures and pressures encountered in the lock hoppers and conduits of the apparatus. The above mentioned density of the liquid is preferred because utilization of the liquid having a density higher than that of the solids would require some additional means for conveying the solids through the liquid. Although such a liquid is generally not preferred, it is within the scope of the invention. Using a liquid with a preferred lower density enables transferring of the solids through the liquid by gravity. Liquids suitable for use in the invention include water and various liquid hydrocarbons. Water is preferred because of its low expense.

Various lines and valves illustrated but not previously mentioned will be described with reference to the following description of apparatus operation.

Firstly, solids are fed to the storage bin. The storage bin can be maintained filled, if desired. Alternatively, a predetermined measured quantity of solids for a predetermined period of operation can be fed into the storage bin so as to only partially fill the bin. This type of operation may be desirable where crushing of the solids produces an undesirable result. With respect to the lock hoppers, operation will be described first with reference to lock hopper 12 for the sake of illustration. It should also be noted that in the subsequent discussion all valves are considered to be closed unless indicated otherwise.

Valve 66 is opened, and liquid is pumped through line 68, line 70 and through valve 66 and line 69 into lock hopper 12 by means of low pressure pump 62. Liquid is introduced into lock hopper 12 so as to preferably only partially fill the lock hopper. Valve 66 is then closed. Valve 26 is then opened so as to allow solids to be introduced through valve 26 and through the inlet of lock hopper 12. Typically, a volume of solids equivalent to about 50-75% of the lock hopper internal volume is introduced to the lock hopper. Valve 26 is then closed. It should be noted that if a non-gravity feed system is utilized to feed solids to the lock hoppers, belts or star valves, for example, can be employed to more accurately meter the amount of solids introduced into the lock hopper. Preferably, valve 34 is open while solids are being fed to lock hopper 12. Thus, if during feeding of solids to lock hopper 12 the liquid level rises above the horizontal level of line 32, liquid will tend to overflow into line 32, through valve 34 and into lock hopper 14. Overflow of liquid is allowed to continue in this manner while solids are being fed to lock hopper 12 so that at least a portion of the excess liquid, or that volume of liquid above the level where line 32 enters lock hopper 12, is passed to lock hopper 14. Preferably, all of the excess liquid is passed to lock hopper 14 so that the liquid level in lock hopper 12 reaches the above-mentioned level. Allowing liquid to pass from one lock hopper to another lock hopper as described above is a convenient and effective technique of establishing a desired liquid level in a lock hopper without any additional overflow collection vessels.

Immediately after feeding of solids to lock hopper 12, valve 34 is closed, and then valve 44 is opened so as to provide fluid communication between lock hopper 16 and lock hopper 12. Solids have been previously discharged from lock hopper 16 such that some gas pressure remains within lock hopper 16. These gases, such as air and various gases which have bled back from high pressure vessel 18, consequently pass through valve 44, line 42 and into lock hopper 12. Preferably, venting of gases from lock hopper 16 to lock hopper 12 is allowed to continue until the pressures in the lock hoppers are equalized. Valve 44 is then closed. Lock hopper 16 is then preferably vented to allow the exit of additional gases by opening valve 71 for a period of time.

The above described venting of gases from one lock hopper to another lock hopper being prepared for pressurization assists in pressurization of the latter mentioned lock hopper. Thus, compression energy is saved and efficiency of the entire process is increased. Furthermore, the illustrated apparatus has the many advantages of a liquid system, such as shorter cycle times and smaller and less expensive lock hoppers.

After the cross-venting step described above, valve 72 is opened. Liquid is pumped by high pressure pump 64 into line 74, through valve 72 and into lock hopper 12. Liquid is continued to be supplied in this manner until the pressure in lock hopper 12 is substantially equivalent to that pressure in high pressure vessel 18. Once this pressure is achieved, valve 72 is closed.

After pressurization of lock hopper 12, valve 53a is opened. Thus, solids contained in lock hopper 12 are discharged therefrom so as to flow through conduit 46 and conduit 52. Most preferably, the liquid level is maintained at a desired height in lock hopper 12 and in conduit 54 during discharge of solids from lock hopper 12. It may be desirable to extend conduit 54 and screw conveyor 56 above the height of the lock hoppers to ensure that no liquid overflows into high pressure vessel 18. Thus, solids discharged from lock hopper 12 flow through liquid contained in conduits 46 and 52, the solids then contacting screw conveyor 56. Maintenance of the liquid levels as described also provides an effective liquid seal between high pressure vessel 18 and lock hopper 12 which inhibits gas flow from high pressure vessel 18 to lock hopper 12. Rotation of screw conveyor 56 causes solids to be conveyed through conduit 54 to its upper end. Solids are then dropped through conduit 61 and into high pressure vessel 18 where they are processed accordingly.

With respect to lock hopper 14, valve 76 is opened, preferably during or immediately after the above mentioned step wherein liquid overflows from lock hopper 12 to lock hopper 14. Liquid is pumped into lock hopper 14 by low pressure pump 62, followed by closure of valve 76. In a manner similar to that discussed with reference to lock hopper 12, solids are introduced to lock hopper 14 and liquid is allowed to overflow to lock hopper 16 utilizing valves 28 and 40. Preferably, the above described liquid introduction (from low pressure pump 62) and solids introduction steps with respect to lock hopper 14 are performed at least partially during pressurization and/or discharging of lock hopper 12. After the discharge of solids from lock hopper 12, gases in that lock hopper are passed to lock hopper 14 so as to assist in its pressurization utilize valve 34. Valve 84 is opened momentarily to vent any additional gases contained in lock hopper 12 through line 86 and into the atmosphere. Lock hopper 14 is pressurized by the pumping of liquid from high pressure pump 64, through line 78, into line 80, and through open valve 82. As before, a pressure is attained in lock hopper 14 substantially equivalent to that pressure in high pressure vessel 18. Valve 82 is then closed. Valve 53b is then opened to allow discharge of solids from lock hopper 14, the solids then being transferred to high pressure vessel 18 by screw conveyor 56.

Lock hopper 16 is filled and pressurized in a manner discussed previously utilizing valves 30, 88 and 90. Liquid is allowed to overflow to lock hopper 12 through valve 44 while solids are fed to lock hopper 16. Gases are allowed to pass from lock hopper 14, after discharge thereof, to lock hopper 16 by means of opening valve 40, followed by venting of lock hopper 14 through valve 92. Solids are discharged after pressurization through valve 53c. After discharge, gases are passed to lock hopper 12 through valve 44.

The above described cycle utilizing three lock hoppers is repeated as many times as needed.

Figure 2:
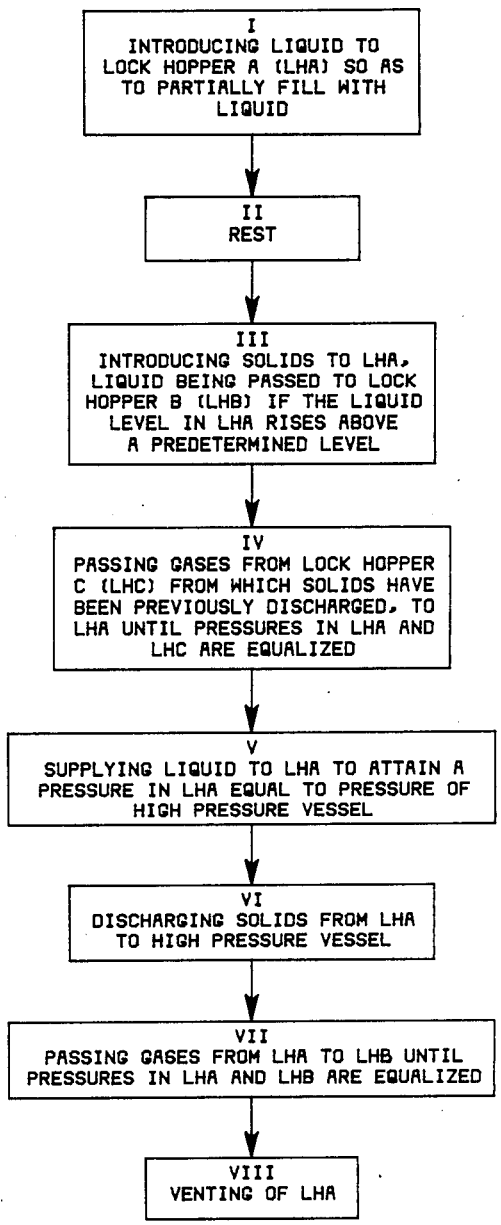
FIG. 2 is a flow chart which outlines the various steps performed with respect to a particular lock hopper according to a preferred embodiment.

Referring to FIG. 2, there is shown a flow chart which outlines various steps performed with respect to a particular lock hopper according to the preferred embodiment which utilizes two additional lock hoppers. The various steps outlined concern a particular lock hopper, denoted simply as lock hopper A for convenience. Lock hopper A as used in FIG. 2 could apply to any one of the three lock hoppers illustrated in FIG. 1. Lock hoppers B and C, the two additional lock hoppers, are also mentioned in FIG. 2 with respect to the steps wherein gases are passed or vented from and to lock hopper A. The step or steps corresponding to each of the eight boxes has been assigned an identifying Roman numeral. A Roman numeral is set forth in each box of FIG. 2.

Figure 3:
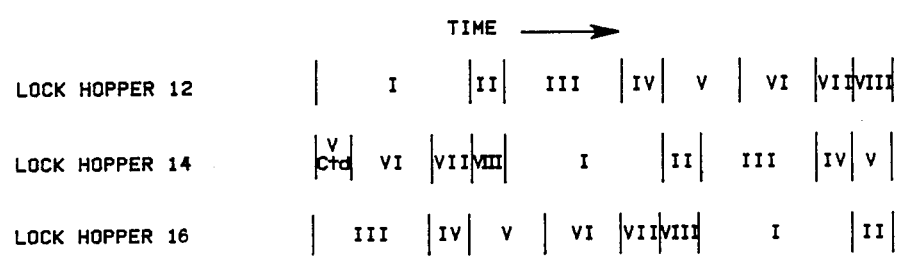
FIG. 3 is a diagram which illustrates one mode of operation for the apparatus of FIG. 1.

Referring now to FIG. 3, there is shown a diagram which sets forth one example of a sequence of steps performed according to the preferred embodiment. As shown, time increases from left to right. The above mentioned numerals I-VIII are utilized to conveniently designate the sequence of steps for each of lock hoppers 12, 14 and 16. It might be noted from the FIG. 3 diagram that the solids discharge to the high pressure vessel is discontinuous. This would not normally be a problem, since a surge bin would typically be positioned between conduit 54 and high pressure vessel 18 according to normal design practice. Such a surge bin is not shown in the FIGURES for clarity of illustration.

As should be apparent, all of the steps performed with the FIG. 1 apparatus can be performed automatically if desired. In such a case, the illustrated valves and pumps are all motor operated, and controlled by a suitably programmed controller or computer which coordinates their operation.

Obviously many modifications and variations of the present invention are possible in light of the above teachings. For example, although the preferred embodiment is described as using three lock hoppers, any number of two or more could be employed. Determination of the appropriate number of lock hoppers depends upon such factors as desired cycle times and economics. The three lock hopper system is generally preferred since it provides relatively continuous feeding of solids to the high pressure vessel, and has the feature of providing a means of continued operation in the case of failure of some part of one lock hopper. Although a two lock hopper system is within the scope of the invention, it is generally not preferred because of its relatively discontinuous feeding of solids to the high pressure vessel, and because of its susceptibility of total shutdown in case of the malfunction of one lock hopper. Providing a number of lock hoppers in excess of three would depend primarily upon economics. Generally, as the number of lock hoppers is increased there are diminishing returns.

What is claimed is:

1. A method for feeding solid materials to a high pressure vessel comprising:
   (a) introducing liquid to a first lock hopper so as to at least partially fill said first lock hopper with said liquid;
   (b) introducing solid materials to said first lock hopper after step (a);
   (c) if during step (b) the liquid level in said first lock hopper rises above a predetermined level, the volume of liquid above said predetermined level being denoted as excess liquid, the step of passing at least a portion of said excess liquid, during step (b), from said first lock hopper to another lock hopper;
   (d) passing gases from a second lock hopper, from which solid materials have been previously discharged, to said first lock hopper;
   (e) supplying a liquid to said first lock hopper after step (d) so as to attain a pressure in said first lock hopper which is substantially equal to the pressure of the high pressure vessel;
   (f) discharging said solid materials from said first lock hopper and through said liquid after step (e) so as to be introduced to said high pressure vessel;
   (g) introducing solid materials to said second lock hopper;
   (h) supplying liquid to said second lock hopper after step (g) until a pressure is attained which is substantially equivalent to the pressure of said high pressure vessel; and
   (i) discharging solid materials from said second lock hopper and through said liquid after step (h) such that the solid materials are transferred to said high pressure vessel.

2. A method as recited in claim 1, wherein steps (b) and (a) are at least partially performed during at least one of steps (h) and (i).

3. A method as recited in claim 2, wherein in step (d), pressures are equalized between said first and second lock hoppers.

4. A method as recited in claim 3, wherein said another lock hopper is a third lock hopper.

5. A method as recited in claim 4, further comprising: introducing liquid, during or immediately after step (i), into said third lock hopper so as to at least partially fill said third lock hopper; introducing solid materials into said third lock hopper; passing gases from said first lock hopper to said third lock hopper immediately after step (f); supplying a liquid to said third lock hopper so as to attain a pressure in said third lock hopper substantially equivalent to the pressure of said high pressure vessel; and discharging solid materials from said third lock hopper to said high pressure vessel.

6. A method as recited in claim 5, wherein said liquid has a density less that of the solid materials.

7. A method as recited in claim 6, wherein said liquid is water.

8. An apparatus comprising:
   a first lock hopper having an inlet and an outlet;
   a second lock hopper having an inlet and an outlet;
   means for providing selective fluid communication between said lock hoppers;
   means for selectively supplying solids to either of said lock hopers through each said respective inlet;
   means for selectively supplying liquids to either of said lock hoppers, wherein said liquids supplying means include a first pump and a second pump, said second pump being adapted to pump liquid at a greater pressure than said first pump, said liquids supplying means being capable of selectively supplying liquid to said lock hoppers by either of said pumps;
   a first valve means, associated with said first lock hopper outlet, for selectively allowing discharge of solids from said first lock hopper;
   a second valve means, associated with said second lock hopper outlet, for selectively allowing discharge of solids from said second lock hopper; and
   a vessel for receiving solids discharged from said lock hoppers.

9. An apparatus as recited in claim 8, wherein said means for providing selective fluid communication comprises a conduit which extends between said lock hoppers, and a third valve means included along said conduit.

10. An apparatus as recited in claim 9, further comprising: a conduit means for forming flow paths between said lock hoppers and said vessel, wherein a portion of said conduit means have a lower end and an upper end, and extends in a generally upward direction from said lower end to said upper end; and a means for transferring solid materials from said lower end to said upper end, said transferring means allowing liquid to drain off said solid materials while being transferred.

11. A method for feeding solid materials to a high pressure vessel comprising:
   (a) introducing liquid to a first lock hopper so as to at least partially fill said first lock hopper with said liquid;
   (b) introducing solid materials to said first lock hopper after step (a);
   (c) if during step (b) the liquid level in said first lock hopper rises above a predetermined level, the volume of liquid above said predetermined level being denoted as excess liquid, the step of passing at least a portion of said excess liquid, during step (b), from said first lock hopper to another lock hopper is carried out;
   (d) passing gases from a second lock hopper, from which solid materials have been previously discharged, to said first lock hopper;
   (e) supplying a liquid to said first lock hopper after step (d) so as to attain a pressure in said first lock hopper which is substantially equal to the pressure of the high pressure vessel; and (f) discharging said solid materials from said first lock hopper and through said liquid after step (e) so as to be introduced to said high pressure vessel.

12. A method for feeding solid materials to a high pressure vessel comprising:
   (a) introducing liquid to a first lock hopper so as to at least partially fill said first lock hopper with said liquid;
   (b) introducing solid materials to said first lock hopper after step (a);
   (c) if during step (b) the liquid level in said first lock hopper rises above a predetermined level, the volume of liquid above said predetermined level being denoted as excess liquid, the step of passing at least a portion of said excess liquid, during step (b), from said first lock hopper to another lock hopper is carried out;
   (d) supplying a liquid to said first lock hopper after step (c) so as to attain a pressure in said first lock hopper which is substantially equal to the pressure of high pressure vessel; and
   (e) discharging said solid materials from said first lock hopper after step (d) so as to be introduced to said high pressure vessel.

* * * * *